US009202068B2

(12) United States Patent
Baschy

(10) Patent No.: US 9,202,068 B2
(45) Date of Patent: Dec. 1, 2015

(54) USER INTERFACE FOR VARIABLE ACCESS CONTROL SYSTEM

(76) Inventor: Leo M. Baschy, Copperopolis, CA (US)

(*) Notice: Subject to any disclaimer, the term of this patent is extended or adjusted under 35 U.S.C. 154(b) by 462 days.

(21) Appl. No.: 11/692,208

(22) Filed: Mar. 28, 2007

(65) Prior Publication Data

US 2007/0234218 A1 Oct. 4, 2007

Related U.S. Application Data

(60) Provisional application No. 60/767,460, filed on Mar. 29, 2006.

(51) Int. Cl.
*G06F 15/16* (2006.01)
*G06F 7/00* (2006.01)
*G06F 17/30* (2006.01)
*G06F 21/60* (2013.01)
*G06F 21/62* (2013.01)

(52) U.S. Cl.
CPC ........ *G06F 21/604* (2013.01); *G06F 17/30011* (2013.01); *G06F 21/6218* (2013.01)

(58) Field of Classification Search
CPC ............... G06Q 10/10; G06F 21/6218; G06F 17/30011
USPC ............................................................. 707/8
See application file for complete search history.

(56) References Cited

U.S. PATENT DOCUMENTS

| 5,379,423 | A | * | 1/1995 | Mutoh et al. ................. 707/204 |
| 5,550,968 | A | | 8/1996 | Miller et al. |
| 5,675,782 | A | | 10/1997 | Montague et al. |
| 5,708,780 | A | | 1/1998 | Levergood et al. |
| 5,742,759 | A | | 4/1998 | Nessett et al. |
| 5,760,917 | A | * | 6/1998 | Sheridan ...................... 358/442 |
| 5,761,669 | A | | 6/1998 | Montague et al. |
| 5,929,854 | A | | 7/1999 | Ross |
| 6,101,480 | A | * | 8/2000 | Conmy et al. ............... 705/7.18 |
| 6,154,741 | A | | 11/2000 | Feldman |
| 6,185,684 | B1 | | 2/2001 | Pravetz et al. |
| 6,202,066 | B1 | | 3/2001 | Barkley et al. |
| 6,205,476 | B1 | | 3/2001 | Hayes, Jr. |
| 6,233,618 | B1 | | 5/2001 | Shannon |
| 6,393,468 | B1 | | 5/2002 | McGee |
| 6,493,731 | B1 | * | 12/2002 | Jones et al. ................... 715/234 |
| 6,502,102 | B1 | | 12/2002 | Haswell et al. |
| 6,523,027 | B1 | | 2/2003 | Underwood |
| 6,711,687 | B1 | | 3/2004 | Sekiguchi |
| 6,738,973 | B1 | * | 5/2004 | Rekimoto ..................... 715/776 |

(Continued)

FOREIGN PATENT DOCUMENTS

JP 2011-186818 A 9/2011
WO WO/2004/010258 1/2004

OTHER PUBLICATIONS

Ka-Ping Yee, User Interaction Design for Secure Systems.

(Continued)

*Primary Examiner* — Jordany Nunez

(57) ABSTRACT

To balance a tendency towards faceless decisions in using role based access control, photographic likenesses of people in roles can be used in access control user interface. For a meaningful representation of different people being in a role at a different times, a near future time chart of people who are predicted to be in roles to access a document or a resource can be displayed next to document contents and resource representations.

14 Claims, 2 Drawing Sheets

(56) References Cited

U.S. PATENT DOCUMENTS

| | | | |
|---|---|---|---|
| 6,768,999 B2* | 7/2004 | Prager et al. | 707/E17.8 |
| 6,950,943 B1 | 9/2005 | Bacha et al. | |
| 6,990,631 B2* | 1/2006 | Narahara | 715/246 |
| 7,051,282 B2 | 5/2006 | Marcjan | |
| 7,076,558 B1* | 7/2006 | Dunn | 709/229 |
| 7,079,177 B2 | 7/2006 | Okazaki et al. | |
| 7,089,530 B1 | 8/2006 | Dardinski et al. | |
| 7,272,639 B1 | 9/2007 | Levergood et al. | |
| 7,272,815 B1 | 9/2007 | Eldridge et al. | |
| 7,287,227 B2 | 10/2007 | Ries et al. | |
| 7,305,624 B1 | 12/2007 | Siegel | |
| 7,321,931 B2* | 1/2008 | Banerjee et al. | 709/224 |
| 7,437,468 B2 | 10/2008 | Yamamoto et al. | |
| 8,223,134 B1 | 7/2012 | Forstall et al. | |
| 8,875,261 B2* | 10/2014 | Delia et al. | 726/6 |
| 2001/0052003 A1* | 12/2001 | Seki et al. | 709/219 |
| 2002/0070865 A1 | 6/2002 | Lancos et al. | |
| 2002/0099837 A1 | 7/2002 | Oe et al. | |
| 2002/0141639 A1 | 10/2002 | Steinberg | |
| 2002/0162002 A1 | 10/2002 | Gunter et al. | |
| 2002/0167538 A1 | 11/2002 | Bhetanabhotla | |
| 2002/0184160 A1* | 12/2002 | Tadayon et al. | 705/57 |
| 2003/0061087 A1* | 3/2003 | Srimuang | 705/8 |
| 2003/0163811 A1* | 8/2003 | Luehrs | 725/25 |
| 2003/0164856 A1* | 9/2003 | Prager et al. | 345/764 |
| 2003/0236996 A1 | 12/2003 | Himmel et al. | |
| 2004/0019799 A1* | 1/2004 | Vering et al. | 713/200 |
| 2004/0054790 A1 | 3/2004 | Himmel et al. | |
| 2004/0103202 A1 | 5/2004 | Hildebrand et al. | |
| 2004/0117194 A9 | 6/2004 | Lee et al. | |
| 2004/0135805 A1 | 7/2004 | Gottsacker et al. | |
| 2004/0193606 A1 | 9/2004 | Arai et al. | |
| 2004/0239700 A1* | 12/2004 | Baschy | 345/781 |
| 2004/0267746 A1* | 12/2004 | Marcjan et al. | 707/8 |
| 2004/0267871 A1* | 12/2004 | Pratley et al. | 709/200 |
| 2005/0028080 A1 | 2/2005 | Challenger et al. | |
| 2005/0097440 A1 | 5/2005 | Lusk et al. | |
| 2005/0138566 A1 | 6/2005 | Muller et al. | |
| 2005/0198139 A1 | 9/2005 | Malkin et al. | |
| 2005/0211784 A1 | 9/2005 | Justin | |
| 2006/0041460 A1 | 2/2006 | Aaron | |
| 2006/0059462 A1 | 3/2006 | Yamamoto | |
| 2006/0080432 A1 | 4/2006 | Spataro et al. | |
| 2006/0101341 A1 | 5/2006 | Kelly et al. | |
| 2006/0106802 A1 | 5/2006 | Giblin et al. | |
| 2006/0117382 A1* | 6/2006 | Karabulut | 726/10 |
| 2006/0155705 A1* | 7/2006 | Kamper et al. | 707/8 |
| 2006/0168529 A1 | 7/2006 | Rokosz et al. | |
| 2006/0195520 A1 | 8/2006 | Stevens et al. | |
| 2006/0292537 A1* | 12/2006 | Nute et al. | 434/307 A |
| 2007/0050362 A1* | 3/2007 | Low et al. | 707/8 |
| 2007/0055775 A1 | 3/2007 | Chia | |
| 2007/0058730 A1 | 3/2007 | Bowra et al. | |
| 2007/0198637 A1 | 8/2007 | Deboy et al. | |
| 2007/0203980 A1 | 8/2007 | Andersen | |
| 2012/0179764 A1* | 7/2012 | Erdal | 709/206 |
| 2012/0254303 A1* | 10/2012 | Anbalagan et al. | 709/204 |
| 2013/0246470 A1* | 9/2013 | Price et al. | 707/783 |

OTHER PUBLICATIONS

Tara Whalen et al, User Experiences with Sharing and Access Control, 2006, ACM 1-59593-298-4/06/0004.
David Nagel interview, Changing Lives Through Technology, ACM Ubiquity, vol. 5, Issue 6, Apr. 7-13, 2004.
Agapow et al, Wikipedia article on Role Based Access Control, Jun. 16, 2011, http://en.wikipedia.org/wiki/Rbac.
Eswaran Subrahmanian, n-dim group Project LIRE, Jul. 2002, http://www.ndim.edrc.cmu.edu/papers/lire.htm.
Johannes Helmig, Windows XP Access control via Security, Dec. 9, 2001, http://www.windowsnetworking.com/articles_tutorials/wxp-pfsec.html.
Microsoft, Use access control to restrict who can use your files, Windows XP Professional, Aug. 24, 2001, http://www.microsoft.com/windowsxp/using/security/learnmore/accesscontrol.mspx.
Unknown, Obiki documentation of The Access Control Tab, Dec. 2004, http://www.obiki.org/docs/accesscontrol.html.
Leo Baschy, Researched History of SubEthaEdit Software.
Google search for the exact wording or phrase "access-control-discontinuous hyperlink", Jun. 30, 2010.
Google search for the exact wording or phrase "discontinuous hyperlink", Jun. 29, 2010.
Roy A. Ruddle et al, The effects of hyperlinks on navigation in virtual environments, International Journal of Human-Computer Studies, vol. 53, Issue 4, Oct. 2000, pp. 551-581, ISSN:1071-5819.
David Vronay, Why Google+ is still not working for humans, Apr. 18, 2012, http://dvronay.blogspot.com/2012/04/why-google-is-still-not-working-for.html.
Tim Berners-Lee, Information Management: A Proposal, CERN, Mar. 1989, http://www.w3.org/History/1989/proposal-msw.html.
Unknown, Wikipedia article on Visual Display Unit, Jun. 24, 2012, http://en.wikipedia.org/wiki/Visual_display_unit.
Unknown, Wikipedia article on False Premise, Mar. 16, 2012, http://en.wikipedia.org/wiki/False_premise.
Small Wonders Software, Security Explorer Data Sheet, Mar. 31, 2004.
Quest Software, Inc., Quest Security Explorer Data Sheet, Jul. 27, 1012, http://www.quest.com/Quest_Site_Assets/PDF/Quest-Security-Explorer-Datasheet.pdf.
Quest Software, Inc., Quest Security Explorer Tour, 7/27/1012, http://www.quest.com/security%2Dexplorer/walkthrough/default.html.
Internet Business Corporation Pty Ltd, Verdi CMS—Granular Permissions, Jul. 27, 2012, http://www.verdicms.com/3/36/4/granular_permissions.pm.
Chris Newman, RE: need review for draft-ietf-Idapext-acl-reqts-01.txt, Apr. 14, 1999, http://lists.w3.org/Archives/Public/ietf-discuss/1999Apr/0005.html.
S. Shepler et al, IETF RFC 3010—NFS version 4 Protocol, Dec. 2000.
S. Shepler et al, IETF RFC 3530—Network File System NFS version 4 Protocol, Apr. 2003.
G. Clemm et al, IETF RFC 3744—Web Distributed Authoring and Versioning WebDAV Access Control Protocol, May 2004.
E. Stokes et al, IETF RFC 2820—Access Control Requirements for LDAP, May 2000.
J. Myers, IETF RFC 2086—IMAP4 ACL extension, Jan. 1997.
Craig R. McClanahan, Authentication and Access Control for Web Applications, JavaOne Session #1291, Jun. 2001.
Nataraj Nagaratnam et al, The Security Architecture for Open Grid Services, Jul. 17, 2002.
David Becker, Software makers ready desktop lockdown, Apr. 20, 2004, http://news.cnet.com/2100-1001_3-5194756.html.
Bruce Chizen interview, Getting Reorganization Right: How Bruce Chizen Drove Change and Innovation at Adobe Systems, Knowledge©Wharton, Apr. 21, 2004.
Cutcom Software Inc., SentryFile Brochure, Jul. 28, 2012, http://www.sentryfile.com/download/sf5_brochureAutoCapture.pdf.
Cutcom Software Inc., SentryFile screen shots, Jul. 18, 2006, http://www.sentryfile.com/index.cfm ? index=PRODUCT/SCREEN_SHOTS.
Cutcom Software Inc., SentryFile screen shots, Jan. 24, 2004, http:web.archive.org/web/20040306064540/http://www.sentryfile.com/index.cfm ? index=PRODUCT/SCREEN_SHOTS.
Unknown, Wikipedia article on Health Insurance Portability and Accountability Act, Aug. 3, 2012, http://en.wikipedia.org/wiki/Health_Insurance_Portability_and_Accountability_Act.
Unknown, Wikipedia article on Electronic health record, Aug. 3, 2012, http://en.wikipedia.org/wiki/Electronic_health_record.
Unknown, Wikipedia article on Personal health record, Aug. 3, 2012, http://en.wikipedia.org/wiki/Personal_health_record.
Healthcare Information and Management Systems Society—HIMSS, Defining and Testing EMR Usability, Jun. 2009, http://www.himss.org/content/files/HIMSS_DefiningandTestingEMRUsability.pdf.
Bryan Kaufman email, Re: HIPAA, EHR, and User Interface Driven Access Control, Aug. 3, 2012.

(56) References Cited

OTHER PUBLICATIONS

Unknown, Wikipedia article on Group in computing, Sep. 30, 2012, http://en.wikipedia.org/wiki/Group_%28computing%29.
Unknown, Wikipedia article on Audience, Sep. 30, 2012, http://en.wikipedia.org/wiki/Audience.
Unknown, Wikipedia article on Filename, Apr. 30, 2013, http://en.wikipedia.org/wiki/Filename.
Unknown, Wikipedia article on Variable in computer science, May 1, 2013, http://en.wikipedia.org/wiki/Variable_%28computer_science%29.
Unknown, Wikipedia article on Tooltip, May 2, 2013, http://en.wikipedia.org/wiki/Tooltip.
Google search for the words "broken hyperlink", May 24, 2013.
Unknown, Webopedia Computer Dictionary entry for "broken hyperlink", May 24, 2013, http://www.webopedia.com/TERM/B/broken_hyperlink.html.
Unknown, Object Management Group article "Verfying Hyperlinks", May 21, 2012, http://www.omg.org/tutorial/list_broken_hyperlinks.htm.
Microsoft Corporation, So that's how! Great FrontPage features sections 16 and 17, May 24, 2013, http://office.microsoft.com/en-us/training/fix-broken-hyperlinks-RZ006197816.aspx ? section=16.
A. Aimar et al., WebLinker, a tool for managing WWW cross-references, Computer Networks and ISDN Systems 28 1995 99-107, Jan. 1995.
D. Ingham et al., Fixing the Broken-Link problem: the W3Objects approach, Computer Networks and ISDN Systems 28 1996 1255-1268, Jan. 1996.
brokenlinkcheck.com Website, Fehlermeldungen, Mar. 26, 2004, https://web.archive.org/web120040326053617/http://brokenlinkcheck.com/.
Sri Atluru et al., English Language & Usage Stack Exchange, Jun. 9, 2011, http://english.stackexchange.com/questions/29141/.
Fumblefingers et al., English Language & Usage Stack Exchange, Feb. 26, 2012, http://english.stackexchange.com/questions/59292/.
Barrie England et al., English Language & Usage Stack Exchange, Jan. 23, 2012, http://english.stackexchange.com/questions/55686/.

* cited by examiner

USER INTERFACE FOR VARIABLE ACCESS CONTROL SYSTEM

RELATED APPLICATIONS

This application claims priority from U.S. Provisional Application Ser. No. 60/767,460 filed Mar. 29, 2006 by Baschy, entitled "User Interface For Variable Access Control", the contents of which is hereby incorporated by reference.

The present invention has been developed and hence can be understood more easily when knowing the invention described in U.S. patent application Ser. No. 10/802,658 filed Mar. 17, 2004 on behalf of Baschy, entitled "User Interface Driven Access Control System and Method", published Dec. 2, 2004 as U.S. Patent Application Pub. No. 2004/0239700, the disclosure of which is hereby incorporated by reference in its entirety.

The present invention has been developed and hence can be understood more easily when knowing the invention described in U.S. patent application Ser. No. 11/308,636 filed Apr. 15, 2006 by Baschy, entitled "User Interface For Non-uniform Access Control System And Methods", published Nov. 9, 2006 as U.S. Patent Application Pub. No. 2006/0253771, the disclosure of which is hereby incorporated by reference in its entirety.

The present invention has been developed and hence can be understood more easily when knowing the invention described in U.S. patent application Ser. No. 11/308,989 filed Jun. 4, 2006 by Baschy, entitled "User Interface Driven Access Control System And Method For Multiple Users As One Audience", the disclosure of which is hereby incorporated by reference in its entirety.

FIELD OF THE INVENTION

The present invention is a method for further improving the ease of use of access control systems employed in computer information storage, retrieval, transmission, and creation.

BACKGROUND OF THE INVENTION

There are a number of access control systems, which often have been difficult enough to hinder their use. Systems as described in aforementioned patent application Ser. No. 10/802,658 can lead to better use of access control systems, specifically to a great increase in varying access control settings for different documents. Systems as described in aforementioned patent application Ser. No. 11/308,636 can lead to safer use of references in documents under access control, and in doing so to a noticeable share of documents which contain and are processed for access dependent contents. Systems as described in aforementioned patent application Ser. No. 11/308,989 can ease correct and safe handling of confidential information when multiple users are coming together and working together with a number of documents.

BRIEF DESCRIPTION OF THE INVENTION

The present invention provides easy to use methods for ensuring that an operator can easily and correctly foresee who will be allowed to access a resource, specifically when using role based access control.

To balance a tendency towards faceless decisions in using role based access control, photographic likenesses of people in roles can be used in access control user interface. For a meaningful representation of different people being in a role at a different times, a near future time chart of people who are predicted to be in roles to access a document or a resource can be displayed next to document contents and resource representations.

DETAILED DESCRIPTION OF THE INVENTION

Figure 1:
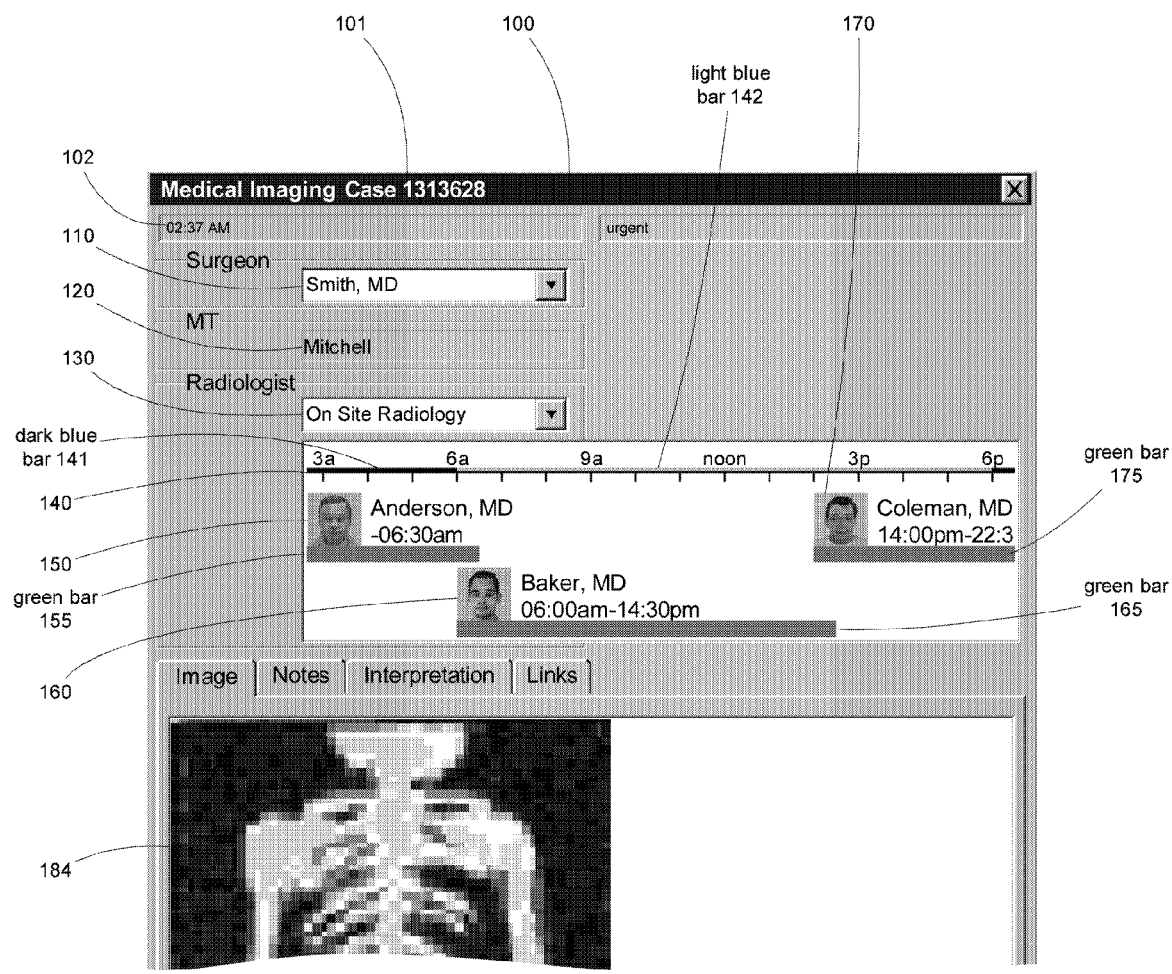
FIG. 1 shows medical records displayed together with information about which professionals have been and may be working on the case, including a near future time chart of who is predicted to be in role On Site Radiology.

Security can mean something different to different people in different contexts. The present invention concerns itself with access control, which is one kind of security, i.e. to "determine who is allowed to access what".

One can easily consider that access control is absurd if one doesn't comprehend its configuration settings (i.e. actual settings) and if one doesn't comprehend their effects. The present invention concerns itself with making access control comprehensible.

Configuration settings of access control can be considered a multidimensional space. Dimensions may include but might not be limited to: Which resource, which users, which operation, . . . . One can see time as another dimension.

Making access control comprehensible may be seen as projecting settings (e.g. entities and relationships) from that multidimensional space into a visual computer display area.

If such display also allows interaction, then it might not only allow comprehension but also control (i.e. modification) by the operator.

Aforementioned patent application Ser. No. 10/802,658, 11/308,636 and Ser. No. 11/308,989 have presented user interface driven access control. They give examples for projecting settings into display areas for easily comprehensible visual displays, including interactive displays.

Now it seems there is a contrast between aforementioned efforts (to clearly show who is allowed to access what) and the concept of role based access control (as known at least through publication of standards, specifications and other writings on that topic).

Is there common ground between the easily comprehensible act of dragging an icon with a photographic likeness of Eric onto a document (and getting visual feedback) versus the act of granting access to the role "External European Development Partner Designated Technical Staff", which apparently may have less predictable consequences? Problems and solutions might revolve around the question: Who is going to be in that role? What real persons are going to be in that role?

The present invention concerns itself with further applying thoughts from those disclosures to making products that support emerging standards such as but not only as RBAC and XACML.

One can ask: If standards allow very (almost arbitrarily) complex settings, then how is one supposed to comprehend settings? Practical limitations exist both in the human mind of the operator as well as in the size of display areas.

Option to See Every Detail

Even with other options being useful, there always should be the option to show views with every detail; at least for sake of completeness. It should be the operator's choice whether he indeed wants to scroll, zoom or otherwise navigate through a large virtual display in a display area or whether he wants a view with less detail.

One example of a view with every detail is in Altova XMLSpy 2006 when editing an XML Schema in Schema Design View in Content Model View when viewing the diagram of an element which is defined by a hierarchy of types when opening all possible nodes. Opening all nodes is possible yet would be a voluntary act by the operator.

Then if given the option to see every detail, most operators most of the time will lack ability or desire to look at highly detailed complex settings.

Few Versus Many

One can see a qualitative difference in the meaning of access control, as well as in its comprehension, between giving access to a small number of people, let's say in the single or low double digits, versus giving access to a large number.

There may be mention in literature that most people don't or one cannot have meaningful relationships with more than maybe about 150 people. For argument's sake let's assume this is meant at the same time.

Similarly there is a limit to the number of people for which an operator can readily grasp exactly which individuals are allowed to access a resource.

Without wanting to underestimate any contemporary organization's ability to maintain discipline in keeping information confidential, it should be easy to imagine a rule of thumb: "If more individual people know about something than can be displayed in half a computer screen then there will be a significant increase in the (correct or incorrect) expectation by some of those individuals that an act of them themselves leaking information will go undetected."

As a digression, then one improvement could be not to let individuals know who else knows (who else is allowed access).

Comprehending Few and Many

An ideal implementation of views of access control settings should (a) allow both view of defined access control settings as well as effective access control settings, (b) automatically switch to the view which makes more sense by an algorithm, (c) allow the operator to chose an alternate view to override the automatic selection of view.

View preference settings should be possible to associate with individual or sets of resources or with individual or sets of operators, hereby allowing to override automatically switching to the view which makes more sense by an algorithm.

A framework of rules could be implemented to determine "the view which makes more sense". Example rules could include (a) if effectively a small number of authorized users then prefer to show effective access control settings, (b) if effectively a large number of authorized users then prefer to show defined access control settings,

. . . .

Combination of rules should be by a rule engine.

In other words, "makes more sense" could be made of a combination of rules including but not only: "If a few, show them individually." "If many, describe them comprehensibly."

UI Code Interfacing Access Control Code

Implementation of the present invention is significantly helped if there is a programmatic interface by which "user interface code" can retrieve information from "access control code" as needed. Data could be exchanged as programming language (e.g. Java) objects or as XML.

Example functionality could include:

(a) determine which users are allowed any access at all to an identified resource, (b) determine what are the defined access control settings for an identified resource, (c) determine which users correspond to a role (which has been referred by defined access control settings), (d) determine which users are assigned to a role at the current point in time, (e) determine which users are predicted to be assigned to a role as time will pass,

. . . .

Whether such a programmatic interface is implemented or not shouldn't be a question of whether it is possible, but it rather should be a question of whether it is considered worth defining and maintaining.

Different Users in a Role in Time

Role based access control has the potential to produce unexpected effects. If one isn't aware who may be in a role, then one doesn't really know who is being granted access.

Different users can be assigned to a role as time passes. A traditional example is leaving a note for the receptionist at a company: "Monday Mar. 16th 2007 after 4 pm package number 4382 will be picked up by Mr. Parker." Leaving the note for role "receptionist" means that whoever is assigned to that role as time passes will be able to read that note. Whether or not there is a time expiration or event triggered expiration for the note document does not matter for this discussion. It is generally known that receptionists on duty change in the course of a day, possibly in shifts, often with at least one person assigned to the role at any given time, i.e. 24/7. The present invention suggests displaying predicted receptionists, optionally in a way that indicates their predicted times on duty, as part of a visual display of access control settings.

Maybe more alerting to some is an example of one medical professional passing on case information to another medical professional. E.g. an emergency room doctor (e.g. a surgeon) or a medical technician may be passing on an image (e.g. an X-ray or a scan) to the radiologist on duty. Indeed, it is the right decision to pass on the image to the role "radiologist on duty". Often the originating medical professional might not have time to care or might not have interest in who the individual is who is on duty. Nevertheless there may be situations where it does make a difference. A surgeon might want to know whether an ambiguous fracture image is going to be read by a colleague whom he considers experienced and reliable, and hence he can avoid spending time on being extra cautious in writing an accompanying note, allowing him to immediately go on with patient care, or whether that image is going to be read by a new colleague in his first year, whereby he might feel compelled to be exceptionally specific in an accompanying note. The surgeon shouldn't have to spend more than a second on glancing at access control settings, looking at the role "radiologist on duty", maybe moving the mouse pointer to the visual representation of the role; and in doing so by seeing a name and/or id photo (details by preference settings) he should be much more certain whom he can expect to be assigned to that role in the immediate future.

In the given medical field example, one purpose of the present invention is to marry organizational requirements and functions of role based access control with an enhanced personal experience of teamwork.

Display of Users Predicted to be in a Role

A visual display of users who are predicted (reasonably expected) to be assigned to a role (as time will pass) can be made permanent, or it can be overlaid (e.g. pop up) when the operator acts in a manner indicating interest, e.g. when the operator moves the mouse pointer close to or inside a visual representation of the role.

Such visual display of users who are predicted to be assigned to a role as time will pass could be two dimensional, with one axis corresponding to time and the other axis allowing for placement of more than one user (who are assigned to the role at the same time). Time slots could be displayed by using discriminating patterns or in alternating colors for easier comprehension. The length of time displayed could be limited to a default value, to a meaningful practical value or it could be adjustable by the operator. One possible display design is for each user a combination of a brightness scale (grayscale) photo id with a bar of a length corresponding to time extent. E.g. a photo id about 24 pixels tall inside a horizontal bar 24 pixels tall, with the horizontal length of the bar being so that one hour corresponds to 10 pixels. Overlapping time extents between two different users can be avoided by vertically shifting the second user's bar down or up by at least a bar's constant tallness, in this example 24 pixels. The bars could be pastel colors, green for write access, gray for read access only, with a white background.

There will be cases of predicting that nothing will change. E.g. role "executive board member" most of the time would be predicted not to change. Visual display for no change could completely omit representation of a time axis. Operators could comprehend: "No time axis displayed means no change predicted."

Backwards Compatibility of Prediction

New designs from scratch at least in some ways should be easier than fitting another element onto or into an existing architecture. Hence, a description of mechanisms for backwards compatibility should not be considered as overall best possible implementation.

If a medical image has been set for access by role "radiologist on duty" then there could be more than one possible backwards compatible implementation to retrieve information describing who will be assigned to that role. One has to assume there are reasonably well organized electronic records describing a calendar for either the whole organization or for each radiologist or both. It would be desirable and should be possible to use a clear algorithm to access such records, either by iterating through them in any of several sequential orders (by time, by person or other) or by using any of several indexes (by time, by person or other).

In case there isn't any better algorithm possible, one should be able to fall back onto polling (canvassing): Assuming there is a minimum time span (interval) shorter than which there aren't any shifts, e.g. five minutes, a routine could in a loop step by such interval through the future time span to be displayed and retrieve the (potentially singular, more populated or empty) set of radiologists for each such spaced point in time.

In case it isn't possible to iterate through records describing a common calendar, it should be possible to iterate through individual calendars of each radiologist.

Almost certainly there should be a practical limit of how far into the future a medical image will be read by a radiologist, e.g. two weeks or six hours. At that time one radiologist should have read it, and he thereby should have become the only one allowed to access it, or it should be transferred to a special administrator. Luckily, such limit consequentially limits how much information needs to be retrieved and should be displayed. Information probably wouldn't be very secure anyway if there weren't a good limit on how many people potentially will be able to see it.

Log Actual Access

When access log information is displayed for a document, e.g. adjacent to document contents, e.g. adjacent to access control settings, then it may occur that access by users is listed who are no longer allowed to access the document. This is natural, and while it may be treated specially, often there should not be any special treatment for this kind of situation. Possible causes include (a) that an operator interactively has effected change to defined access control settings, (b) there could have been a change in assignments to roles as time has passed or (c) there could have been an event that has triggered execution of code to change defined access control settings, e.g. an automatic removal of certain access control settings after a medical image actually has been read by one radiologist, or an automatic removal of certain access control settings after a patient passes certain milestones, e.g. after or at the patient's release from an organization's care, or automatic time expiration.

Telling Apart Roles from Individuals

For sensitive documents access often is limited to a few individuals only. For more generally accessible documents, however, use of roles should be more prevalent.

Consistent with that kind of use, it is beneficial if the difference between individuals and roles is well emphasized in user interface. Distinguishing factors could include well-chosen and strictly applied color, icons, a clearly recognizable frame, style (of icon, of font), shape (e.g. single bust versus multiple busts), . . . . E.g. a role could be required to always be represented by a certain kind of busts icon: One generic image of a person with a second person as dimmed outline in the background 75% person width to the right.

Also, individuals could be visually grouped in one display area versus roles grouped in another display area (e.g. on the left versus on the right, . . . ). Alternatively, roles could always appears first (e.g. on the top or on the left in a top to bottom, left to right writing system), so that once individuals are shown the operator can be certain no more roles will follow; rationale in this example based on the idea that role means more individuals, less secure by mere quantity, less predictable.

What is clearly recognizable (and what isn't) can be suggested by an artist or an experienced or gifted individual, yet good practice includes established methods of user interface design, including user observation and cognitive science to actually measure people's ability to correctly and easily recognize (the matter presented).

Representing Superior Authority

Even when there is a sensitive document there might still be the possibility of a superior authority accessing the document for auditing or for investigations. Optional ways of displaying those possibilities include: (a) A cartoonish icon, whose predicted assigned users maybe look like system administrators or spooks, (b) a smaller icon, (c) a warning label or (d) not at all.

From Few Individuals to Large Audiences

For product engineering projects often there is a phase during initial development when only a small number of individual people are involved. At that stage one is expected to keep tight control over documents.

Later in the life cycle, when products get released to large audiences (but maybe not to the general public), then one can only expect to understand access control by roles and groups in general, rather than individual people.

In the context of such transitions, a practical feature would be to allow an operator to test against (for) specific users. E.g. pick one user and query whether he is allowed to access (a specific resource). E.g. if the definition is to allow access by investors and advisors and prospects then if Clark Kent is known to be a reporter then querying whether he is allowed to access should show denying access. This wouldn't be an absolute test, but it is a practical test. Think GUI, drag and drop, and use of a programmatic interface by which "user interface code" can retrieve information from "access control code". The logic (code) to determine whether he is allowed to access (or not) should be the same logic (code) as if he were to attempt access himself, though not requiring authentication.

DETAILED DESCRIPTION OF THE DRAWINGS

FIG. 1 shows medical records displayed together with information about which professionals have been and may be working on the case, including a near future time chart of who is predicted to be in role On Site Radiology.

The window 100 comprises a few standard user interface elements that are neither innovative nor of elevated importance to the present invention, including a descriptive title 101 and record attributes such as the time 102 when an image has been taken.

The following user interface elements are somewhat closer related to the present invention: Representations of the surgeon 110 on the case and of the medical technologist 120 who has taken the image. Those are of individuals though, not of roles. For good reasons in the real world context, but also of lesser relevance to demonstrate the present invention, the surgeon on the case still could be changed, but the MT who has taken the image cannot be changed.

Most essential to demonstrate the functioning of the present invention is the representation of the radiologist 130 assigned to read the image: A role named "On Site Radiology".

A time axis 140 for better clarity is colored differently for night 141 than for day 142. Radiologists of On Site Radiology (be it a separate company, a division of a hospital or another kind of group found fit to be given a role of that name) who are scheduled to work (their respective shifts) in the near future are represented by their respective photographic likenesses and names, Anderson 150, Baker 160, and Coleman 170, located along the time axis and spaced vertically to avoid overlaps, yet spaced compactly, further annotated with the time spans of their respective shifts in textual representation as well as by green bars 155, 165, and 175 along the durations of their respective shifts.

Last not least, one essential content of such medical record system is a medical image 184. Another essential content will be the interpretation of the image by a radiologist.

Not meant to suggest a limit on potential implementations, at least three different, reasonably backward compatible ways to program the logic underlying the user interface can be pointed out:

1) Traditionally "Surgeon", "MT", and "Radiologist" probably would have been fields of a record or of an object. Access control could be determined by whether the user matches at least one of the fields, with such match being equality for individuals, membership for groups, or "being in a role" or "holding a role".

2) Who is authorized to access the record could be held in a set of elements, and whether to display an element as Surgeon, MT, or Radiologist could be determined by case specific attributes set on elements of the set.

3) Who is authorized to access the record could be held in a set of elements, and whether to display an element as Surgeon, MT, or Radiologist could be determined by an elements membership in other sets (e.g. Smith being in the set of surgeons always would be a surgeon, Mitchell being in the set of MTs always would be an MT) based upon simple logic or upon a set of rules.

Figure 2:
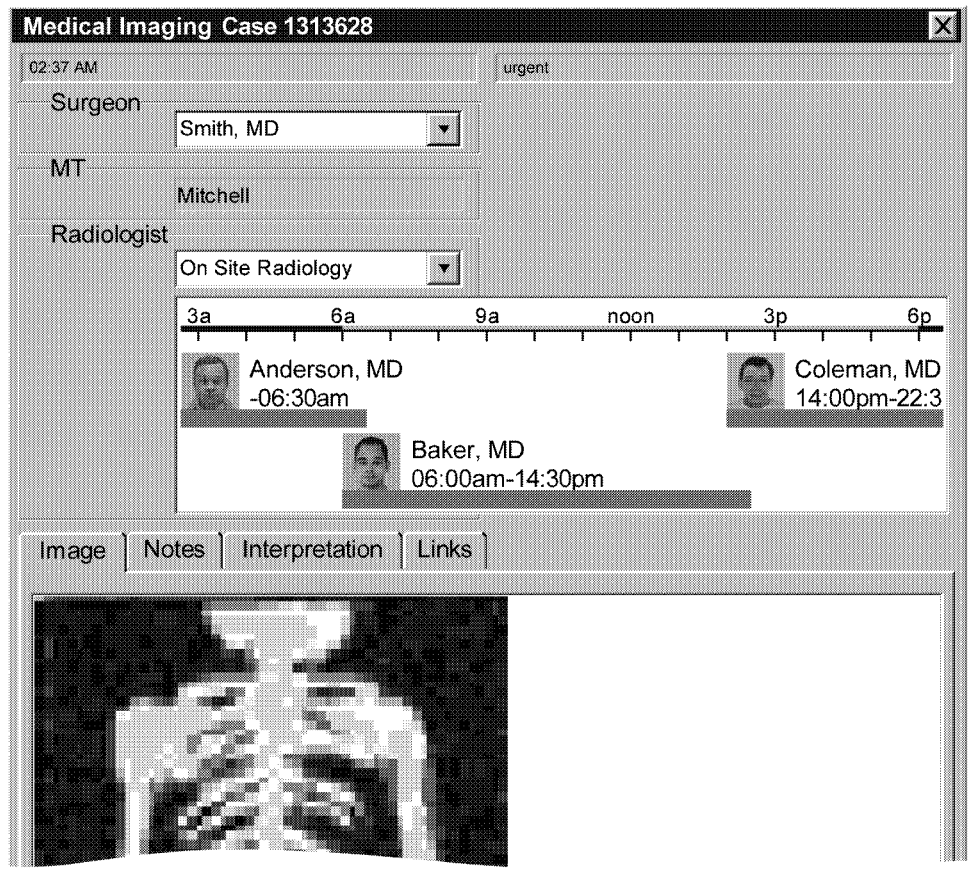
FIG. 2 shows the same as FIG. 1, without the clutter of labels.

FIG. 2 shows the same as FIG. 1, without the clutter of labels, for easier comprehension.

In other words, FIGS. 1 and 2 show a graphical user interface for comprehensibly displaying who will be allowed to access a document while at the same time displaying document contents, comprising: a display region for document contents; and a display region indicating different sets of people who will be allowed to access the document at different times.

Also, FIGS. 1 and 2 show time spans during which an individual person will be allowed to access the document are laid out in an intelligible chart format.

General Observations

The present invention has been devised to work well but not only with systems built as described in aforementioned patent application Ser. No. 10/802,658, 11/308,636 and Ser. No. 11/308,989.

In order to implement the present invention, skills in both user interface engineering and access control engineering are required. In both fields there are practitioners of greatly varying levels of skill and experience. The quality of an implementation will more or less depend on the skill and experience of those who engineer it. Other skills that might be considered distinct and helpful include experience in network protocols, markup language, Web services, storage servers, workflow, algorithm development and expert systems.

According to the theory and practice of the present invention, there are practical limits to the amount of abstract reasoning that should be demanded of an operator of a system. These limits may be different from person to person; the limits may be different for a one-time effort and for repeated performance. According to the theory and practice of the present invention one can achieve much higher rates of correct decisions by operators by relieving them of the need to perform complex symbolic mental operations.

A Set of Rules is a System

A rules engine may be using a method to process rules, but a set of rules often clearly can be seen as a system.

A set of data (possibly considered "input data") through a set of rules (some being constraints) can be tied to selecting among available display elements (e.g. whether to show a photographic likeness, an abstract shape or a textual representation) and to positioning and to shaping display elements.

In his article "Some Guidelines For Deciding Whether To Use A Rules Engine" George Rudolph writes: "If you have 3 or more conditions in your rules (or, for example, a block with 3 or more nested if-statements in pseudo-code), then consider using a rules engine." And: "In cases where you find you may not really know or understand the rules you are trying to encode in your algorithm, a rules engine can provide a flexible way to encode and modify the rules over time as they are discovered." Hence, use of a rules engine and declarative programming techniques can help limiting development cost.

Clarifications

A "normal size, legibly scaled, unabridged representation of the content of a document" is what commonly is shown in normal use by a word processing application or by a drawing software when the operator views or edits a document. An example of "normal size, legibly scaled, unabridged representation of the content of a document" is display region 184 in FIG. 1. A "normal size, legibly scaled, unabridged representation of the content of a document" is different than a thumbnail of a drawing or a summary of a document.

A display region indicating people predicted to be allowed to access a document and a display region for content of the document are "concurrently visible and concurrently operable" if the operator can choose to initiate a function in either region without having to effectively put away the other. It will be appreciated by one skilled in the art that recognizable examples of "concurrently visible and concurrently operable" display regions are in FIGS. 1 to 2, where all display regions are visible at the same time and all display regions by using the same minimal number of steps by the operator can be interacted with equally immediately to initiate functions, with such steps required to initiate a function in contemporary art frequently being one mouse movement and one mouse button pressing and one mouse button releasing, the steps of pointing and clicking. In contrast, a modal dialog box for access control would not be concurrently operable with a document content region, as the modal dialog box would block editing of document content until after the modal dialog box goes away, such going away e.g. caused by the operator clicking on an OK or Cancel button in the dialog, although then with the document content region being operable the modal dialog box would neither be visible nor operable until initiated to be shown again and to block editing again. Also in contrast, tabbed panes don't provide concurrent visibility, i.e. access control versus content if in two separate panes wouldn't be concurrently visible.

A "real person" is in contrast to a "role" of "role based access control". The real persons in FIG. 1 have last names. "Effective" in the context of access control is discussed extensively in aforementioned patent application Ser. No. 10/802, 658. "Effective" means after definitions and rules have been evaluated and applied, what is the effect then. Commonly someone would "effectively be having a predetermined role" if that "user has been assigned that predetermined role". In addition though, e.g. if that user were a member of a group and that group has been assigned the predetermined role then one would expect that user would "effectively be having that predetermined role" even though that "user has NOT been assigned that predetermined role", unless an unusual rule would prevent that effect in a specific instance. Hence, there is specific meaning to displaying what "real persons are predicted to effectively be having a predetermined role of a system of role based access control".

REFERENCES

XACML Profile for Role Based Access Control (RBAC), Committee Draft 01, 13 Feb. 2004, document identifier: cs-xacml-rbac-profile-01

RBAC DRAFT—Apr. 4, 2003, BSR, INCITS 359, American National Standard for Information Technology—Role Based Access Control, Secretariat, Information Technology Industry Council (ITI), American National Standards Institute, Inc.

Xtensible Access Control Markup Language (XACML) Version 1.1, Committee Specification, 7 Aug. 2003, document identifier: cs-xacml-specification-1.1.pdf A Brief Introduction to XACML, Last Updated: Mar. 14, 2003, at the Organization for the Advancement of Structured Information Standards (OASIS) website Envisioning Information by Edward Rolf Tufte, 1990

Ruling Out: Rule Engines and Declarative Programming Come to Java, by N. Alex Rupp, at the java.net website, 2004-08-19

Some Guidelines For Deciding Whether To Use A Rules Engine, by George Rudolph, at the Jess home page, at the Sandia National Laboratories website

What is claimed is:

1. A visual display hardware unit displaying a graphical user interface displaying who in the course of time will be allowed by means of a computer access control system to access a specific document while at the same time displaying the document's contents, comprising:
    a first display region on the visual display unit displaying the document's contents at normal size, legibly scaled, and unabridged; and
    a second display region in a comprehensible manner simultaneously:
    indicating for a plurality of different times in the future for each time a set of individually indicated persons who are predicted, by at said time having a specific role of a computer access control system with role based access control, at said time to be allowed by means of said computer access control system to access said document, in contrast to being denied access at other times; and
    indicating a plurality of respective time spans;
    wherein among said different times said sets of individually indicated persons are different;
    wherein at least one of said persons at the present point in time is not allowed to access said document and nonetheless is predicted to be allowed access in the future;
    wherein differences among said different sets of individually indicated persons at said different times are caused at least in part by said computer access control system;
    wherein said first display region for contents and said second display region for persons are concurrently visible, are concurrently operable, and appear to an operator as in an integrated graphical user interface; and
    wherein a plurality of said different sets of individually indicated persons comprise each and every person predicted to be allowed to access said document during their respective time spans; and
    wherein data being used for determining its display indicating sets of individually indicated persons and time spans comprises:
    access control settings for said document;
    data that defines role memberships; and
    data for predicting times of changes of persons being in roles.

2. The visual display unit of claim 1, wherein persons are indicated by display elements comprising, at least in part, likenesses of those persons.

3. The visual display unit of claim 1, wherein time spans during which an individual person will be allowed to access said document are laid out in an intelligible chart format according to a virtual or visible time axis.

4. The visual display unit of claim 1, wherein data being used comprises calendar entries.

5. The visual display unit of claim 1, wherein said second display region for persons for all of said time spans respectively indicates the individual identity of each and every individual person making up said sets of individually indicated persons.

6. The visual display unit of claim 5, wherein for a plurality of said times a plurality of said individual identities are simultaneously perceptible.

7. The visual display unit of claim 5, wherein for a plurality of said times all of said individual identities are simultaneously perceptible.

8. A digital computer comprising at least:
    a processing unit connected to memory;
    further connected to a visual display unit hardware device, the computer programmed to produce a graphical user interface displaying who in the course of time will be allowed by means of a computer access control system to access a specific document while at the same time displaying the document's contents, comprising:

a first display region on the visual display unit displaying the document's contents at normal size, legibly scaled, and unabridged; and a second display region in a comprehensible manner simultaneously:

indicating for a plurality of different times in the future for each time a set of individually indicated persons who are predicted, by at said time having a specific role of a computer access control system with role based access control, at said time to be allowed by means of said computer access control system to access said document, in contrast to being denied access at other times; and indicating a plurality of respective time spans;

wherein among said different times said sets of individually indicated persons are different;

wherein at least one of said persons at the present point in time is not allowed to access said document and nonetheless is predicted to be allowed access in the future;

wherein differences among said different sets of individually indicated persons at said different times are caused at least in part by said computer access control system;

wherein said first display region for contents and said second display region for persons are concurrently visible, are concurrently operable, and appear to an operator as in an integrated graphical user interface; and wherein a plurality of said different sets of individually indicated persons comprise each and every person predicted to be allowed to access said document during their respective time spans; and wherein data being used for determining its display indicating sets of individually indicated persons and time spans comprises:

access control settings for said document;

data that defines role memberships; and data for predicting times of changes of persons being in roles.

9. The computer of claim 8, wherein persons are indicated by display elements comprising, at least in part, likenesses of those persons.

10. The computer of claim 8, wherein time spans during which an individual person will be allowed to access said document are laid out in an intelligible chart format according to a virtual or visible time axis.

11. The computer of claim 8, wherein data being used comprises calendar entries.

12. The computer of claim 8, wherein said second display region for persons for all of said time spans respectively indicates the individual identity of each and every individual person making up said sets of individually indicated persons.

13. The computer of claim 12, wherein for a plurality of said times a plurality of said individual identities are simultaneously perceptible.

14. The computer of claim 12, wherein for a plurality of said times all of said individual identities are simultaneously perceptible.

* * * * *